United States Patent [19]

Morghen

[11] Patent Number: 4,538,355
[45] Date of Patent: Sep. 3, 1985

[54] REMOVABLE AND REPLACEABLE INDEXING AND LOCATING TOOLING COMPONENT

[75] Inventor: Manfred Morghen, San Diego, Calif.

[73] Assignee: General Dynamics Corporation/Convair Div., San Diego, Calif.

[21] Appl. No.: 565,247

[22] Filed: Dec. 23, 1983

[51] Int. Cl.³ .................................................. G01B 5/25
[52] U.S. Cl. .................................................. 33/180 R
[58] Field of Search ............. 33/180 R, 181 R, 174 H, 33/184.5

[56] References Cited

U.S. PATENT DOCUMENTS 3,381,554  5/1968  Plochi et al. ...................... 33/184.5
3,600,813  8/1971  Davis ................................ 33/180 R Primary Examiner—Willis Little
Attorney, Agent, or Firm—John R. Duncan; Frank D. Gilliam

[57] ABSTRACT

An indexing and locating component to be used with a fixture for precision machining of parts. The component includes a receiver bushing press fitted into a fixture and a locating pin which is adjustable rotationally as well as vertically. A lock nut locks the pin in a predetermined position and permits removal and replacement of the pin with another pin having another configuration. Locating pins of various configurations are shown.

9 Claims, 5 Drawing Figures

REMOVABLE AND REPLACEABLE INDEXING AND LOCATING TOOLING COMPONENT

BACKGROUND OF THE INVENTION

This invention relates to improvements in tooling for precision machining and more particularly, but not by way of limitation, to a removable and replaceable indexing and locating component adapted to be used with a sub-plate for the precision machining of parts.

Numerous types of locating pins are known in the prior art as operable to support a part on a machine or position a workpiece on a tooling jig. These locating pins are often used with a gage plate for setting fixtures and the like, such plates conventionally comprising a base and an accurately formed top surface with a plurality of circumferentially spaced accurately formed and located openings therein. Obviously, such a gage plate is expensive and time consuming to manufacture because each opening must be very accurately located with relation to the other openings. In addition, any changes in temperature in use may cause the gage plate to lose its accuracy.

The prior art locating pins are often of "round" and "relieved" configuration. They are often used together, mounted on a fixture a distance apart corresponding to a distance between two apertures on a workpiece. When a workpiece is placed on the locator pins the round one provides restraint in all directions and the relieved locator is so designed to provide transverse restraint only.

One commonly used prior art relieved locator pin is commonly referred to as a diamond locator, because of its essentially diamond-shaped cross section. In use, however, known prior art locator pins are subject to a number of defects. One class of locator pins are elemental in construction and provide only the most rudimentary type of locator pin. Another type is constructed of many precision machined parts which then require exact assembly and adjustment to function as a locator pin.

Commonly, locator pins of the first type include only a bushing that is press fitted into a hole in a fixture or sub-plate. A locating pin is then inserted into the bushing or is pre-inserted into the bushing prior to it being press fitted into the fixture. Such locator pins while acceptable for some applications are non-adjustable and cannot be easily replaced or interchanged with other pins as the need should arise.

Examples of the latter type of locator pins previously discussed are shown in U.S. Pat. Nos. 2,497,679; 3,158,045; and 3,286,354. Characteristically, this type of locator pin provides for a central bore to be formed in the fixture or sub-plate. A plurality of eccentrically formed sleeves are then inserted within one another and rotated until a desired orientation has been achieved to provide the desired locator hole. The sleeves are then locked into position by one or more particularly configured bolts which bear against the outer periphery of one or more of the eccentric sleeves.

The present invention provides a simple, readily manufactured locator pin that may be easily inserted into a fixture and which has a locating portion that may be easily interchanged or replaced as the need should arise.

SUMMARY OF THE INVENTION

Briefly stated, the present invention provides a novel indexing and locating component adapted to be used with a sub-plate for precision machining of parts and includes an annular tubular bushing that is provided with internal threads in a portion thereof and which is preferrably press fitted into a fixture or sub-plate. A locator means is replaceably positioned within the bushing and extends above the upper surface of the sub-plate for indexing and locating a production part for machining. A removable locking means cooperates with the bushing and the locator means to lock the locator means in a predetermined vertical and rotational position and yet permits easy removal or replacement of the locator means as the need should arise. This feature permits great flexibility in providing tooling for applications such as numerical control operations utilizing sub-plates where it is desirable or necessary to alternate positions of round and relieved locator pins.

In one aspect of the invention the locator means provides a round pin which cooperates with a workpiece for proper positioning thereof on the sub-plate for machining. In another aspect of the invention, the locator means provides a relieved pin such as a diamond shaped or elliptically shaped pin. The locator means may also provide a precisely positioned aperture or a floating pin.

These and other aspects of the indexing and locating component of the present invention are set forth more completely in the accompanying FIGURES and the following description.

DETAILED DESCRIPTION OF THE DRAWINGS

Figure 1:
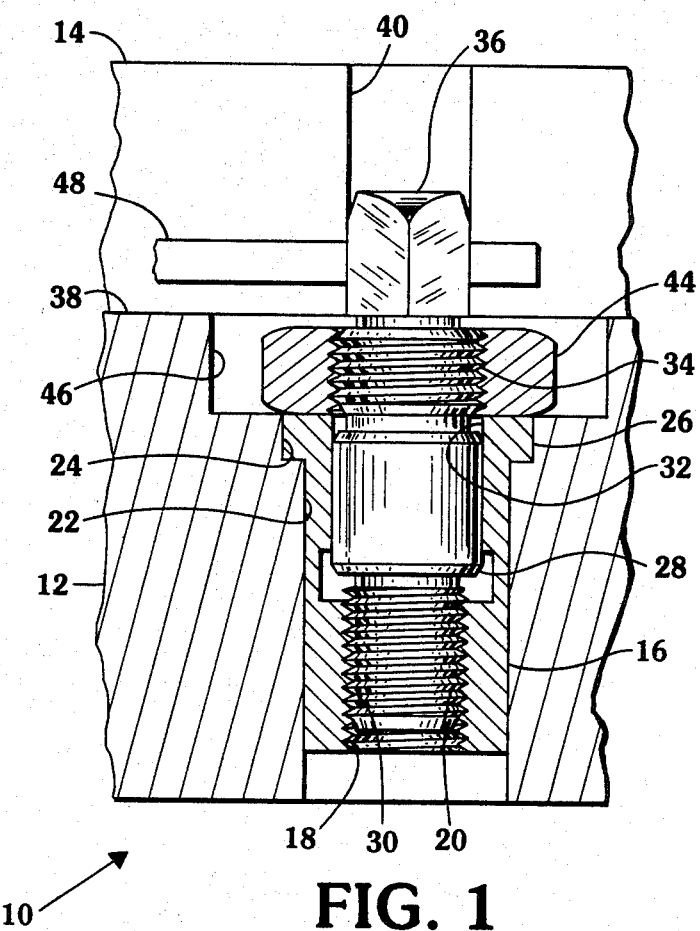
FIG. 1 is a section of an indexing and locating component constructed in accordance with the present invention and illustrating a diamond shaped pin included in the locator means.

Referring now to the drawings in detail and in particular to FIG. 1, the reference character 10 generally illustrates an indexing and locating component constructed in accordance with the present invention and adapted to cooperate with a suitable sub-plate or fixture 12 to correctly position a workpiece 14 shown in dotted outline for clarity of illustration.

The component 10 includes a tubular bushing 16 having a longitudinally extending bore 18 that is provided with suitably threaded portion 20. The diameter of the bore 18 may vary according to the particular design of a locating means that cooperates therewith and which will be described in more detail hereinafter.

The external diameter of the bushing 16 is preferably sized so as to be press fitted within a predetermined bore 22 provided in the sub-plate 12. The bore 22 is preferably provided at one end thereof with an enlarged portion 24 which cooperates with a radially extending shoulder 26 provided on one end of the bushing 16 to assist in positioning of the bushing 16 within the sub-plate 12.

Figure 2:
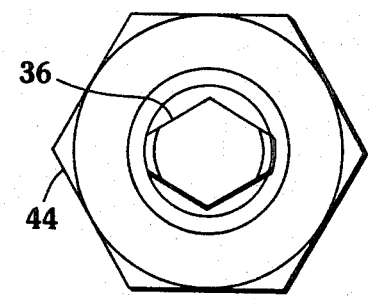
FIG. 2 is a top view of the indexing and locating component illustrated in FIG. 1.

A locator means is replaceably positioned within the bushing 16 and is adapted to extend above the upper surface of the sub-plate 12 for indexing and locating a production part 14 that is to be positioned on the sub-plate for machining. In the embodiment of the invention illustrated in FIGS. 1 and 2 this locator means takes the form of a pin 28 that is removably positioned within the bushing 16. The pin 28 includes a threaded portion 30 which cooperates with the threaded portion 20 of the bushing for accurately positioning the pin 28 both vertically and radially. The pin 28 also includes a portion 32 that is closely received within the bore 18 to give the pin 28 added rigidity in use. The pin is also provided with a threaded portion 34 and a head 36 that extends above the upper surface 38, the surface 38 being preferrably accurately dimensioned, for insertion into a cooperating aperture 40 formed in the workpiece 14.

Figure 3:
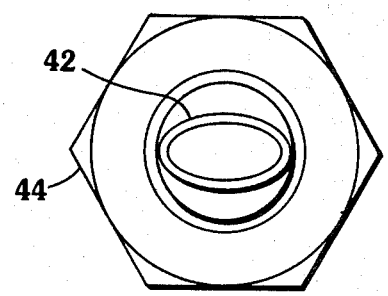
FIG. 3 is a top view of the indexing and locating component shown in FIG. 1 but having an oval shaped pin included in the locator means.

In the embodiment of the invention illustrated in FIG. 1 the head 36 is shown as being generally diamond shaped which would accurately position the workpiece 14 in at least one direction. However, it would also be within the scope of the present invention to provide a head that is relieved as in FIG. 3 to provide an oval or elliptical head 42 or one that is round, as will be illustrated hereinafter.

A removable locking means cooperates with the bushing 16 and the locator means shown as pin 28 to lock the pin in a predetermined vertical and rotational position. This locking means is illustrated in the present embodiment of the invention as a threaded jam nut 44 which cooperates with the threaded portion 34 of the pin 28 to jam the nut 44 against the upper shoulder 26 of the bushing 16 to secure it in a predetermined position. It will be understood that the sub-plate 12 will be relieved as at 46 to accommodate whatever wrench means (not shown) that may be utilized to lock the jam nut 44 in final position.

Prior to the final locking of the jam nut 44 against the bushing 16, the head 36 of the pin 28 may be precisely oriented, as will be required for precision machining of the workpiece 14, by a special adjustment wrench which has an aperture formed therein to closely receive the particularly relieved head portion 36 of the pin 28, the aperture of said wrench being either diamond shaped or oval shaped depending upon usage of head 36 or 42.

Figure 4:
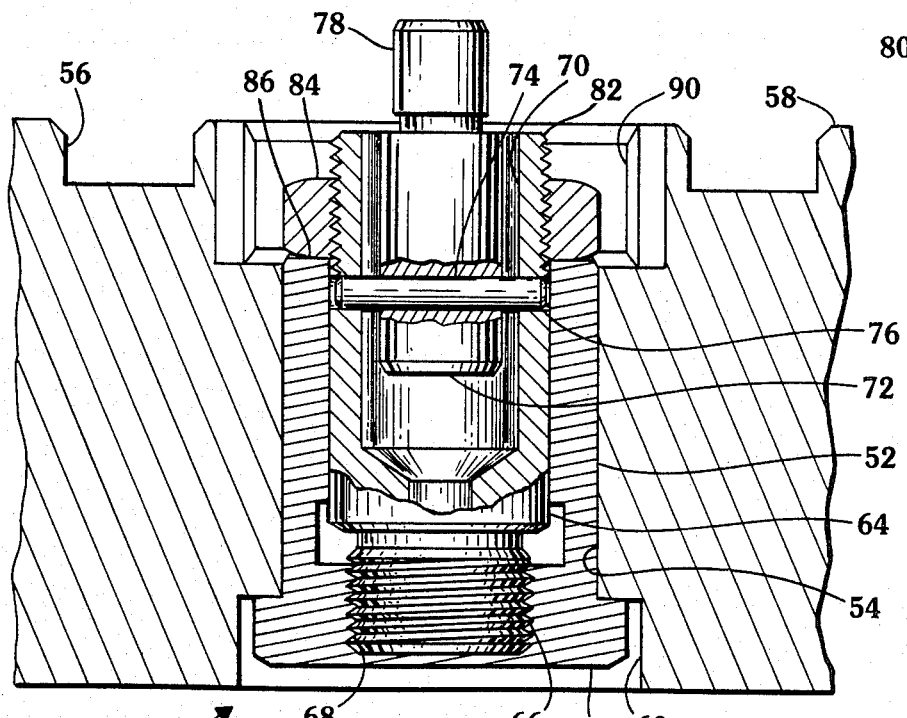
FIG. 4 a section of another embodiment of an indexing and locator component that is constructed in accordance with the present invention and which illustrates a round floating pin as being included in the locator means.

Referring now to FIG. 4, another embodiment 50 of the present invention will be illustrated. In this embodiment 50 of the invention, a generally tubular bushing 52 is positioned with a predetermined bore 54 within a suitable fixture or sub-plate 56 which has an accurately dimensioned upper surface 58. The bore 54 and the bushing 52 are preferably sized so that the bushing 52 may be press fitted into the bore 54. The bore 54 is provided with an enlarged portion 60 at one end thereof to receive an outwardly extending flange 62 which then cooperates with the sub-plate 56 to vertically position the bushing 52.

A locator means in the form of a generally tubular locator bushing 64 is then positioned within the receiver bushing 52. A threaded portion 66 on the outer periphery of the bushing 64 cooperates with a complementarily threaded portion 68 of the bushing 52 to permit the bushing 64 to be vertically positioned within the bushing 52 with accuracy and yet held therein with requisite firmness. The main body of the bushing 64 is preferably positioned within the bushing 52 in a slip fit. An inner bore 70 of the locator bushing 64 is accurately machined to provide an accurately dimensioned aperture for insertion of a pin associated with a workpiece to be machined.

Figure 5:
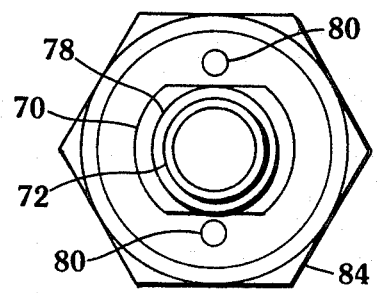
FIG. 5 is a top view of the embodiment of the indexing and locating component shown in FIG. 4.

However, in the illustrated embodiment the locator bushing 64 is provided with a floating pin 72 that is secured against movement in at least one direction by a pin 74 which extends transversely through the pin 72 and into apertures 76 in the locator bushing 64, the pin 74 precluding vertical movement of the locator pin 72 within the bushing pin 64. In FIG. 5, it will be seen that the head portion 78 of the pin 72 is round but it can be formed to a relieved shape, if so desired, such as was previously seen in FIGS. 2 and 3.

Since the head portion 78 of the locator pin 72 has been shown as round, rotational and vertical adjustment of the pin 72 is accomplished by inserting a suitable configured wrench (not shown) into apertures 80 provided in the upper face 82 of the locator pin 64.

After the locator pin 64 has been rotated into its desired position, it is locked therein by a suitable jam nut 84 which threadedly engages the upper outer portion of the bushing 64 and by engaging the upper surface 86 of the receiver bushing 52 to secure the pin 72. The sub-plate 56 is appropriately relieved in the area 90 immediately surrounding the nut 84 in order to permit access by any suitable wrench (not shown) to have engagement therewith.

It can thus be seen that the present invention provides simply constructed replaceable and removable indexing and locating means which provides great flexibility in the tooling required for accurate machining of workpieces.

The foregoing description of the invention is explanatory thereof and various changes in the size, shape and materials, as well as in the details of the illustrated constructions may be made, within the scope of the appended claims without departing from the spirit of the invention.

I claim:

1. An indexing and locating component adapted to be used with a sub-plate for precision machining of parts and comprising:

a generally tubular bushing having a longitudinally extending predetermined bore that is provided with a threaded portion, the external diameter of the bushing being sized so as to be capable of being received within a predetermined bore in the sub-plate;

a locator means replaceably positioned within the bushing and adapted to extend above the upper surface of the sub-plate for indexing and locating a production part that is positioned on the sub-plate for machining; and a removable locking means cooperating with the bushing and the locator means to lock the locator means in a predetermined vertical and rotational position.

2. The indexing and locating component of claim 1 wherein the external diameter of the bushing is sized so as to be press fitted within the bore in the sub-plate and the bushing is provided with a radially extending portion on at least at one end thereof that fits within an enlarged portion of said bore and which bears against a shoulder provided by said enlarged portion of the bore.

3. The indexing and locating component of claim 1 wherein the locator means is provided with a threaded portion which cooperates with the threaded portion of the bushing so as to permit rotational and vertical adjustment of said component.

4. The indexing and locating component of claim 3 wherein the locator means includes a diamond shaped pin formed on the end which extends above the sub-plate for accurately positioning a workpiece for machining.

5. The indexing and locating component of claim 3 wherein the locator means includes a round shaped pin formed on the end which extends above the sub-plate for accurately positioning a workpiece for machining.

6. The indexing and locating component of claim 3 wherein the locator means includes an elliptically shaped pin formed on the end which extends above the sub-plate for accurately positioning a workpiece for machining.

7. The indexing and locating component of claim 3 wherein the locator pin includes a central bore in which is positioned a pin which is restrained against movement and which extends above the subplate for accurately positioning a work piece for machining.

8. The indexing and locating component of claim 3 wherein the locking means comprises a jam nut having an internally threaded portion which cooperates with an externally threaded portion of the locator means and having a plurality of externally disposed lands which provide surfaces that cooperate with a complementarily configured wrench for tightening the nut against the bushing and fixing the locator means in a vertical and rotational position.

9. The indexing and locating component of claim 3 wherein the locator means is provided with a longitudinally extending central bore having at least a portion thereof formed with precise dimensions for receiving a pin associated with a workpiece to be machined for precisely aligning said workpiece.

* * * * *